United States Patent Office 3,635,883
Patented Jan. 18, 1972

3,635,883
STABILIZED STYRENE-ACRYLONITRILE
POLYMER COMPOSITIONS
Walter Stamm, Carmel, N.Y., assignor to Stauffer
Chemical Company, New York, N.Y.
No Drawing. Continuation-in-part of application Ser. No. 728,360, May 10, 1965, now Patent No. 3,539,527, dated Nov. 10, 1970. This application May 7, 1970, Ser. No. 35,584
Int. Cl. C08f 45/62
U.S. Cl. 260—45.75 K
21 Claims

ABSTRACT OF THE DISCLOSURE

There are disclosed high molecular weight styrene-acrylonitrile polymer compositions exhibiting a high degree of stability containing an effective concentration of a stabilizer mixture comprising: (a) a $C_2$–$C_8$ alkyl stannoic or $C_2$–$C_8$ alkyl thiostannoic acid and (b) a compound having the formula:

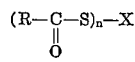

wherein R is a hydrocarbyl group containing from 3 to about 21 carbon atoms, n is an integer having a value of from 1 to 2, X is selected from the group consisting of hydrogen, alkali metal, alkaline earth metals and acyl moieties having a hydrocarbyl essentially hydrocarbon residue and containing from about 1 to about 17 carbon atoms inclusive. This combination of stabilizers has proven to be particularly effective in acrylonitrile-butadiene-styrene copolymer compositions. Included among the preferred stabilizers of group (a) are: ethyl stannoic acid; n-butyl stannoic acid; n-butyl thiostannoic acid; and, n-octyl stannoic acid while the preferred stabilizers of group (b) include thiollauric anhydride; thiol-lauric acid; thioloieic anhydride; thiolbenzoic anhydride and thiolstearic anhydride. This stabilizing system is one of the few proposed for styrene-acrylonitrile type resins which is not based on a hindered phenol.

RELATED APPLICATION

This application is a continuation-in-part of copending application Ser. No. 728,360, filed May 10, 1968 now U.S. Pat. 3,539,527, issued Nov. 10, 1970.

BACKGROUND OF THE INVENTION

The present invention relates to the stabilization of styrene-acrylonitrile polymers against degradation and discoloration due to heating. Still more particularly, the invention relates to the heat stabilization of such styrene polymers employing a blend comprising (a) certain alkyl stannoic and alkyl thiostannoic acids and (b) certain thiol acids and derivatives thereof which are hereinafter defined.

It is well known that styrene-acrylonitrile polymers and, in particular, styrene-acrylonitrile polymer compositions containing butadiene polymerized therein, degrade at the elevated temperatures required for operations such as blending, molding and shaping. While this problem is not acute in respect to the homopolymer of styrene, the subject copolymers are seriously affected, particularly when such copolymers contain a polymerized diene. In order to overcome the problem, a suitable amount of a heat stabilizing composition is generally blended with a styrene-acrylonitrile copolymer material prior to molding or blending. One suitable component of commercial stabilizing compositions employed widely today is the hindered phenol type stabilizer such as 2,6-di-t-butyl-p-cresol. Aryl amines represent another class of stabilizer materials. These materials provide satisfactory stabilization, but each has certain deficiencies such as color formation, cost, toxicity and stability.

In the above noted copending application, there is described a novel stabilizing system for styrene-acrylonitrile copolymer compositions comprising certain thiol acids and derivatives thereof. Although the use of the latter compounds provided generally satisfactory results, it was noted that there was still some undesirable discoloration evident subsequent to the exposure to heat of the styrene-acrylonitrile copolymers containing these stabilizers.

Thus, it is the prime object of this invention to provide an improved stabilizer system for styrene-acrylonitrile copolymers. More particularly, it is the object of this invention to provide a stabilizer system for styrene-acrylonitrile copolymers which substantially prevents discoloration upon their being exposed to high temperatures. Various other objects and advantages of this invention will be apparent from a reading of the disclosure which follows hereinafter.

TECHNICAL DISCLOSURE OF THE INVENTION

In accordance with the present invention, stabilized styrene-acrylonitrile copolymer compositions are provided which contain, as a stabilizer, an effective amount of blend of (a) a $C_2$–$C_8$ alkyl stannoic acid or a $C_2$–$C_8$ alkyl thiostannoic acid and (b) a compound of the type:

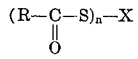

wherein R is a hydrocarbyl group consisting essentially of hydrogen and carbon having from 3 to 21 carbon atoms and preferably from 6 to 17 carbon atoms, n equals 1 or 2, and X is selected from the group consisting of hydrogen, alkali metal including ammonium, alkaline earth metals, and an acyl moiety of the type.

wherein R' is a hydrocarbyl group consisting essentially of hydrogen and carbon containing from about 1 to about 17 carbon atoms inclusive. The term "consisting essentially of hydrogen and carbon" refers to substituted hydrocarbon moieties containing an occasional or infrequent substituent comprising an element other than hydrogen carbon, e.g., nitrogen or chlorine, which does not materially alter the properties of the hydrocarbon residue, i.e., it remains inert, as well as to purely hydrocarbon moieties.

This invention is predicated upon the discovery that the incorporation of, for example, about 0.1 wt. percent, based on the resins of a compound from group (a) and about 2 wt. percent, based on the resin, of a compound from group (b) in a styrene-acrylonitrile polymer provides an unexpected improvement in stability during heat processing. In the practice of the present invention, it has been found that the incorporation of a blend of n-butyl stannoic acid and thiollauric anhydride into an acrylonitrile-butadiene-styrene copolymer (ABS) in an amount such that the sulfur content of the mixture is as low as 0.1% by weight gives a particularly unexpected improvement in stabilization at high temperature.

Illustrative of the $C_2$–$C_8$ alkyl stannoic and alkyl thiostannoic acids of group (a) are: ethyl; n-propyl; iso-butyl; n-butyl; iso-hexyl; n-octyl; and, iso-octyl stannoic and thiostannoic acids and mixtures thereof.

From the above list of alkyl stannoic and alkyl thiostannoic acids, it is to be noted that optimum results are attained by the use of n-butyl and iso-hexyl stannoic acids. It should also be pointed out that one may utilize stabilizer blends containing two or more of these alkyl stannoic or alkyl thiostannoic acids in combination with one or more of the below described thiol acid or thiol anhydride compounds.

These alkyl stannoic and alkyl thiostannoic acids are commercially available materials which are readily prepared by means of various synthetic routes. Thus, they may be made by hydrolysis or thiolysis of the corresponding mono-alkyl tin trihalides; the latter method of synthetic preparation being fully disclosed in the literature.

Representative groups of compounds within the scope of the above-identified formula for the thiol acid and thiol anhydride compounds of group (b) include the aliphatic thiol acids such as the fatty thiol acids, the alkali metal soaps of the fatty thiol acids, alkaline earth metal soaps of the fatty thiol acids, as well as the fatty thiolanhydrides; aromatic thiol acids, alkali metal salts of the aromatic thiol acids, alkaline earth salts of the aromatic thiol acids, as well as the aromatic thiol anhydrides.

Representative of specific compounds suitable for use in accordance with the present invention include thiolcaproic, thiolenantic, thiolcaprylic, thiolpelargonic, thiolcapric, thiolundecanoic, thiollauric, thioltridecanoic, thiolcarboxylic analogs of so-called neo-acids, thiolstearic, thiolnonadecanoic, thiolarachidic and thiolheneicosanoic acids; thiolnaphthenic acid, thiolbenzoic acid, phenylthiolacetic acid, methylthiolbenzoic acid, tolylthiolacetic acid, naphthalenethiolcarboxylic acids, as well as the alkali and alkaline earth salts and anhydrides thereof. Compounds containing the same number of carbon atoms as the above listed compounds but which have unsaturated bonds present, e.g., undecylenic, oleic and thiolcrotonic acids, etc., are likewise suitable.

Representative of preferred specific compounds within such groups include thiolstearic acid, thiolpalmitic acid, thiolversatic acid, thiollauric acid, thiolbenzoic acid, thioltoluic acid, thiolmesitoic acid, zinc thiolstearate, calcium thiolstearate, cadmium thiolstearate, barium thiolstearate, magnesium thiolpalmitate zinc thiollaurate cadmium isododecanoate, mixed thiol fatty acid soaps, zinc thiololeate, thiolstearic anhydride, stearic palmitic thiolanhydride, thiolbenzoic anhydride, thiollauric anhydride, potassium thiololeate, soaps and thioltallates, dodecenyl succinic thiolanhydride, thiolphthalic and thioltetrahydrophthalic anhydride, and the like, as well as mixtures of such compounds.

The following compounds are illustrative of the essentially hydrocarbon moieties containing an occasional and infrequent inert substituent other than hydrogen and carbon: alpha-hydroxythiolstearic acid; 9,10-dihydroxythiolstearic anhydride; zinc 11-aminothiolundecanoate; and, nitro and chlorothiolbenzoic anhydrides.

As indicated above, compounds of the type set forth in the foregoing list are useful in improving the thermal stability of styrene-acrylonitrile polymers when used in combination with one of the previously described $C_2$–$C_8$ alkyl stannoic or $C_2$–$C_8$ alkyl stannoic acids.

The term "styrene-acrylonitrile polymers," is intended to apply to any polymer containing copolymerized styrene and acrylonitrile monomers. These polymers are all well known in the art and include styrene-acrylonitrile copolymers (SAN) as well as copolymers containing additional copolymerizable monomers copolymerized therewith, such as styrene-acrylonitrile-methylmethacrylate; styrene-acrylonitrile-ethylmethacrylate, styrene-acrylonitrile-butadiene (ABS); and, styrene-acrylonitrile-butadiene-methylmethacrylate copolymers and the like.

The term "styrene," as used therein, is intended to include such polymerizable monomers as styrene, alphamethyl styrene, chlorostyrene and the like. These monomers and their use as copolymerizable monomers with acrylonitrile as well as with mixtures of acrylonitrile and one or more other copolymerizable monomers are well known in the art. Accordingly, they require no further definition here.

The stabilizer blends of the present invention are particularly applicable to the styrene-acrylonitrile-butadiene copolymers commonly referred to as the "ABS rubbers," which are generally of two types, namely, types B and G. Type B is a mechanical blend of a styrene-acrylonitrile copolymer and a butadiene-acrylonitrile copolymer. Type G is composed of a mixture of a styrene- acrylonitrile copolymer and a graft of a styrene-acrylonitrile copolymer onto polybutadiene along with varying amounts of ungrafted polybutadiene. A thorough discussion of the ABS plastics can be found in "ABS plastic" by Basdekis, Reinhold Plastic Application series, Reinhold Publishing Company, 1964.

In the styrene-acrylonitrile copolymers, the styrene is generally present in an amount in excess of 25%, by weight, and is usually present in an excess of 50% by weight. Styrene-acrylonitrile copolymers per se generally contain between 65/35 and 76/24 styrene/acrylonitrile on a weight ratio basis.

While the two-part stabilizer blends of the present invention exhibit marked improvement over closely related stabilizers, it is understood that the two-part blends of the present invention can be even more advantageously employed in combination with co-stabilizing additives known in the art which include, for example, such compounds as: organic phosphites; phenolic compounds including hindered or alkyl substituted phenols; barium or cadmium phenolates; phosphinates; phosphonates; mercaptides; and, sulfides as well as other additives known in the art of styrene-acrylonitrile polymer stabilization.

It is apparent that the ratio of the stannoic acid compound to the fatty thiol compound in the stabilizer blends of the present invention will vary over a wide range, depending upon the particular stannoic acid and fatty thiol compounds which are employed, the particular styrene-acrylonitrile copolymer composition which is employed, the degree of stabilization required, the particular end use of the stabilized resin, the presence of other co-stabilizing additive materials, as well as the time and temperature processing requirements which are utilized in preparing the final product. Thus, the use of blends which contain between about 0.1% and 10%, by weight of the styrene-acrylonitrile polymer, of one or more of the thiol acid or thiol anhydride compounds along with between about 0.01 to 1.0%, by weight of the styrene-acrylonitrile polymer, of one or more of the alkyl stannoic or alkyl thiostannoic acid compound, will be sufficient for most applications. However, the preferred range is a blend containing between about 0.5 and about 5% of one or more of the thiol acid or thiol anhydride compounds and between about 0.05 to 0.5% of one or more of the alkyl stannoic or thiostannoic acid compounds; the latter proportions being based upon the weight of the polymer.

The thiol acids and anhydrides useful in the stabilizer blends of the present invention can be prepared in accordance with procedures known in the literature as well as from the novel procedures hereinafter specified. Thiolstearic acid, for example, can be prepared from stearoyl chloride and hydrogen sulfide as well as from stearoyl chloride and alkali or alkaline earth salts of hydrogen sulfide. In the practice of the present invention, thiolstearic acid (M.P. 37°–41° C.) has been prepared from stearoyl chloride and hydrogen sulfide in 96 percent yield employing pyridine as an HCl acceptor. The preparation of certain other thiol acids, e.g., thiolmyristic, thiolbenzoic, as well as thiolpalmitic acids has likewise been reported in the literature. They can also be obtained by cleavage of acid anhydrides with hydrogen sulfide. In general, the organic thiol acids are practically colorless at room temperature.

It is contemplated that thiol acids can be produced in accordance with two separate processes as described below. Firstly, the production of such acids is contemplated by the reaction of the desired carboxylic acid, e.g., decanoic acid, with phosphorus pentasulfide ($P_2S_5$) to produce the corresponding thiol acid, e.g., thioldecanoic acid. The thiol acid is then separated from the by-products of the reaction, e.g., the dithiolacids, as well as from any unreacted carboxylic acid and phosphorus pentasulfide by any convenient procedure such, for example, as by distillation. Another contemplated process route involves the cleavage of fats, or other esters of fatty acids, employing either hydrogen sulfide under an elevated pressure in the presence of catalysts or salts of hydrogen sulfide. Hydrogen sulfide pressures in the range of from about 100 to 1,000 p.s.i. are believed to be suitable for this purpose. The reaction is represented formulistically below with a glyceride, or fat, wherein R represents a suitable aliphatic hydrocarbon moiety as hereinbefore defined:

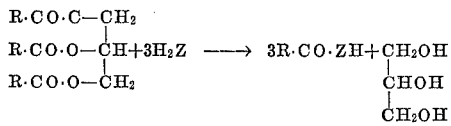

The above represented process appears highly attractive from an economic standpoint since the glycerides are readily available in commerce at low cost, e.g., as tallow fats, and this process is, accordingly, recommended.

The alkaline earth metal soaps of thiol acids such as the respective zinc, cadmium, calcium and barium soaps of thiolstearic acid are also useful compounds in the practice of the present invention. It has been found that the soaps useful in the present invention can be prepared by metathetical exchange reactions between a suitable alkali thiolstearate salt and a salt of an alkaline earth metal. The soaps can also be produced by the reaction of alkaline earth oxides, acetates or carbonates, for example, with fatty thiol acids. Illustrations of the preparation of these compounds as well as the preparation of thiolstearic anhydride and thiolbenzoic anhydride are presented below.

ILLUSTRATION I

Zinc thiolstearate

At a temperature of 40° C., 62 grams (0.203 mole) of thiolstearic acid in 500 milliliters of ethanol is added, with stirring, to 13.35 grams (0.203 mole) of 85% pure potassium hydroxide which is dissolved in 125 milliliters of alcohol. The agitated slurry is then warmed up to 50° C. After 30 minutes, 13.6 grams (0.101 mole) of anhydrous zinc chloride which is dissolved in 300 milliliters of alcohol is introduced. The reaction mixture is warmed up to 70° C. for 30 minutes and then quickly filtered while hot. Upon cooling, about 78 grams (approximately 60% of theory) of zinc thiolstearate crystallizes out. Additional product is then obtained from the mother liquor. The melting point of pure zinc thiolstearate is 92°–95° C.

ILLUSTRATION II

Barium thiolstearate

To a slurry of 36 grams of thiolstearic acid in 500 milliliters of ethanol, is added 72 grams of a 77% pure KOH in ethanol. After 30 minutes, a hot, 50% aqueous ethanol solution containing 31.6 grams of barium nitrate is added to the hot, agitated potassium thiolstearate solution. After 10 minutes, the hot reaction mixture is filtered and the filrate cooled. A crystalline precipitate is recovered in practically quantitative yield. It is washed with hot water and dried over $P_2O_5$; M.P. 162°–166° C.

ILLUSTRATION III

Thiolstearic anhydride

To 2.0 grams (0.066 mole) of thiolstearic acid in 50 milliliters of carbon tetrachloride, are added 2.1 grams (0.069 mole) of stearoyl chloride and ten drops of pyridine at 40°–50° C. After one hour, pyridine hydrochloride is removed by filtraion, and the filtrate is evaporated to dryness. The resultant solid (5.3 grams; M.P. 76–79° C.) is recrystallized from heptane: M.P. 78–79° C.; yield practically quantitative. The compound has a sharp band in the I.R. at 5.75μ and analyzes correctly.

ILLUSTRATION IV

Preparation of thiolbenzoic anhydride

In 300 milliliters of hot water, there is dissolved 140 grams of 60% aqueous sodium sulfide. To this solution is added three grams of a commercial wetting agent [1] and 90 grams of disodium acid phosphate hydrate as a buffer. After cooling the mixture to 0° C., 280 grams of benzoyl chloride is added with continued stirring of the mixture. The batch temperature is kept below 15° C. throughout. Thiolbenzoic anhydride is filtered from the reaction mixture, washed with cold water and dried under vacuum at 35° C. The product has a melting point of 47–49° C. and is recovered in 96% yield.

ILLUSTRATION V

Preparation of thiollauric anhydride

In a reaction flask provided with a stirrer, dropping funnel and an efficient cold water condenser, are dissolved 21.6 grams (0.1 mole) of thiollauric acid in 50 milliters of benzene. A constant stream of dry nitrogen is sparged through the agitated solution which is warmed up to 60° C. Then, 22 grams of distilled lauroyl chloride is slowly added to the reactor through the dropping funnel. The addition is completed in about 30 minutes, and the reaction is brought to completion by stirring the mixture for about four hours at reflux temperature. A small amount of pentane (about 20 milliliters) is then added to the solution which is cooled down to room temperature. Thiollauric anhydride crystallizes out in good yield and high purity. Melting point 52°–54° C.

ILLUSTRATION VI

Preparation of thiololeic anhydride

Molar quantities of thiololeic acid and oleoyl chloride are reacted under conditions practically identical to those employed in Illustration V. Thiololeic anhydride is isolated as a colorless oil which is analytically pure without distillation.

ILLUSTRATION VII

Preparation of thiolstearic thiolbenzoic anhydride

One mole of thiolstearic acid is charged to a reaction vessel containing 500 milliliters of benzene as solvent. One mole of benzoyl chloride is added and the reaction is heated to reflux and maintained at reflux for approximately 3 hours. The product is recovered by removal of the solvent.

Upon being blended with 0.1 g. of n-butyl stannoic acid, 2.0 g. of the mixed thiolstearic/thiolbenzoic acid anhydride, the resulting blend provides excellent stability and compatibility upon being admixed, respectively, with 100 g. of SAN and ABS resin compositions.

ILLUSTRATION VIII

Preparation of thiolstearic/thiolacetic anhydride

This compound is prepared in a manner identical to that of Illustration VII except that one mole of acetyl chloride is used in place of the benzoyl chloride.

While the alkaline earth metal soaps of the thiol acids set forth above provide stabilization to styrene-acrylonitrile copolymers when blended with an alkyl stannoic or alkyl thiostannoic acid, it is preferred to employ the thiol acids or the thiol anhydrides per se as stabilizers in the novel blends of this invention as these compounds provide enhanced stabilization.

In the examples which follow and throughout this specification, all parts and percentages given are by weight unless otherwise specified.

EXAMPLE I

Part 1

A number of stabilized styrene-acrylonitrile copolymer compositions are prepared by respectively blending each

---

[1] Aerosol AT trademark of American Cyanamid.

of the particular polymer products, as described below, with 2%, by weight, of each of the following groups of thiol stabilizers. The various formulations are blended until a homogeneous composition is obtained. They are then subjected to a conventional milling test to determine their dynamic heat stability as evidenced by color formation. In this milling test, a total of 50 g. of the blended samples are milled at a constant roll temperature of 320° F. for a period of 15 minutes. At the conclusion of the test, it is observed that the best results are those blends displaying a slight yellow tone. In each case, however, the resulting blends are found to exhibit considerably improved thermal stability as compared with a control which comprised a sample of each unmodified polymer, i.e. no stabilizer was added.

POLYMERS (1) Styrene-acrylonitrile-butadiene copolymer (ABS Type B)
(2) Styrene-acrylonitrile-butadiene copolymer (ABS Type G)
(3) Styrene-acrylonitrile copolymer containing 65 parts styrene to 35 parts acrylonitrile
(4) Styrene-acrylonitrile copolymer containing 76 parts styrene to 24 parts acrylonitrile.

STABILIZERS (A) Thiolstearic anhydride
(B) Thiolstearic acid
(C) Thiollauric anhydride
(D) Thiollauric acid
(E) Thiolbenzoic acid
(F) Thiololeic anhydride Part 2

In order to demonstrate the improved results obtained in the process of this invention, an additional batch of each of the stabilized polymer products whose formulation is described in Part 1, hereinabove, are prepared. However, in this instance, the fresh batch of each respective blend also contains 0.2%, by weight, of one of the following alkyl stannoic and alkyl thiostannoic acids:

(1) n-butyl stannoic acid
(2) iso-butyl stannoic acid
(3) iso-hexyl stannoic acid
(4) n-butyl thiostannoic acid
(5) iso-butyl thiostannoic acid
(6) iso-hexyl thiostannoic acid Thus, in each case, subsequent to the above described milling test which is used to determine dynamic heat stability, it is found that the presence of the alkyl stannoic or alkyl thiostannoic acid results in a substantial decrease in discoloration as compared with the corresponding formulation, as prepared in Part 1, which does not contain an alkyl stannoic or alkyl thiostannoic acid.

What is claimed is:
1. A heat stabilized polymeric material which comprises a styrene-acrylonitrile copolymer and an effective concentration of a stabilizer mixture comprising (a) at least one $C_2$–$C_8$ alkyl stannoic or $C_2$–$C_8$ alkyl thiostannoic acid and (b) at least one compound of the type:

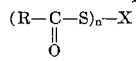

where R is a hydrocarbyl group consisting essentially of hydrogen and carbon having from 3 to 21 carbon atoms, $n$ is an integer from 1 to 2, and X is selected from the group consisting of hydrogen, alkali metal, alkaline earth metal, and an acyl moiety having a hydrocarbyl essentially hydrocarbon residue and containing from 1 to 17 carbon atoms inclusive.

2. The stabilized material of claim 1, in which R is an aliphatic essentially hydrocarbon group having from 6 to 17 carbon atoms.

3. The stabilized material of claim 1, in which R is an aromatic group.

4. The stabilized material of claim 3, in which R is phenyl.

5. The stabilized material of claim 1, in which X represents hydrogen.

6. The stabilized material of claim 1, in which said compound of group (b) is thiolstearic acid.

7. The stabilized material of claim 1, in which X represents an acyl moiety having an aliphatic essentially hydrocarbon residue.

8. The stabilized material of claim 7, in which X represents an acyl moiety having a hydrocarbyl essentially hydrocarbon residue which has from 6 to 17 carbon atoms.

9. The stabilized material of claim 8, in which said stabilizer compound of group (b) is thiolstearic anhydride.

10. The stabilized material of claim 1, in which said styrene-acrylonitrile copolymer is acrylonitrile-butadiene-styrene rubber.

11. The stabilized material of claim 1, in which said stabilizer compound of group (b) is thiolbenzoic anhydride.

12. The stabilized material of claim 1, in which said stabilizer compound of group (b) is thiollauric anhydride.

13. The stabilized material of claim 1, in which said stabilizer compound of group (b) is thiololeic anhydride.

14. The stabilized material of claim 1, in which said $C_2$–$C_8$ alkyl stannoic acid of group (a) is selected from the group consisting of ethyl-; n-propyl-; iso-butyl; n-butyl-; iso-hexyl-; n-octyl-; and, iso-octyl stannoic acids and mixtures thereof.

15. The stabilized material of claim 14, in which said $C_2$–$C_8$ alkyl stannoic acid is n-butyl stannoic acid.

16. The stabilized material of claim 14, in which said $C_2$–$C_8$ alkyl stannoic acid is iso-hexyl stannoic acid.

17. The stabilized material of claim 1, in which said $C_2$–$C_8$ alkyl thiostannoic acid is selected from the group consisting of ethyl-; n-propyl-; iso-butyl-; n-butyl-; iso-hexyl-; n-octyl-; and, iso-octyl thiostannoic acids and mixtures thereof.

18. The stabilized material of claim 17, in which said $C_2$–$C_8$ alkyl thiostannoic acid is n-butyl thiostannoic acid.

19. The stabilized material of claim 1, in which said $C_2$–$C_8$ alkyl stannoic or $C_2$–$C_8$ alkyl thiostannoic acid of group (a) is present in a concentration of from about 0.01 to 1.0%, and said compound of group (b) is present in a concentration of from about 0.1 to 10.0%; the latter proportions being based on the weight of said styrene-acrylonitrile copolymer.

20. The stabilized material of claim 19, wherein said $C_2$–$C_8$ alkyl stannoic or $C_2$–$C_8$ alkyl thiostannoic acid of group (a) is present in a concentration of from about 0.05 to 0.5%, and said compound of group (b) is present in a concentration of from about 0.5 to 5.0%; the latter proportions being based on the weight of said styrene-acrylonitrile copolymer.

21. The stabilized material of claim 1, wherein said compound of group (a) is n-butyl stannoic acid and said compound of group (b) is thiollauric anhydride.

References Cited

UNITED STATES PATENTS

| | | | |
|---|---|---|---|
| 3,021,302 | 2/1962 | Frey et al. | 260—45.75 |
| 3,461,091 | 8/1969 | Stamm | 260—23 |
| 3,466,307 | 9/1969 | Stamm et al. | 260—399 |
| 3,539,527 | 11/1970 | Stamm | 260—45.7 |

DONALD E. CZAJA, Primary Examiner

V. R. HOKE, Assistant Examiner

U.S. Cl. X.R.

260—45.7 S, 880, 881